United States Patent [19]
Lawlar

[11] 3,805,880
[45] Apr. 23, 1974

[54] CIRCULATING COOLING SYSTEM
[75] Inventor: John B. Lawlar, Morristown, N.J.
[73] Assignee: Allied Chemical Corporation, New York, N.Y.
[22] Filed: Apr. 24, 1972
[21] Appl. No.: 247,121

[52] U.S. Cl.......................... 165/1, 165/60, 165/95, 165/106
[51] Int. Cl.............................. F24f 3/14
[58] Field of Search .......... 165/95, 1, 60, 106, 134, 165/107, 32

[56] References Cited
UNITED STATES PATENTS
3,627,032  12/1971  Glad .................................... 165/95

*Primary Examiner*—Charles Sukalo
*Attorney, Agent, or Firm*—Jack B. Murray, Jr.; Gerard P. Rooney

[57] ABSTRACT

A closed circuit cooling system for servicing industrial equipment is provided wherein environmental pollution attributable to the discharge of toxic and otherwise polluting additives, such as chromates, phosphates and various biocides, by the common practice of "blowdown," is avoided. The usual loss of expensive additives from the system is minimized and scaling of the waterside surfaces of the equipment being serviced is obviated. These benefits are achieved in a cooling system wherein an aqueous coolant is circulated to industrial equipment for heat absorption, then to an evaporating zone where heat is removed from the coolant by partial evaporation, then back to the industrial equipment for further heat absorption. Coolant-free solids are removed from the circulating system by bleeding a minor portion of the coolant, separating the solids therefrom and returning the bleed to the system. The additives are recovered from the solids by water washing, returning the water containing the recovered additives to the circulating system, and maintaining a balanced system by introducing soft make-up water to the coolant without blowdown.

7 Claims, 1 Drawing Figure

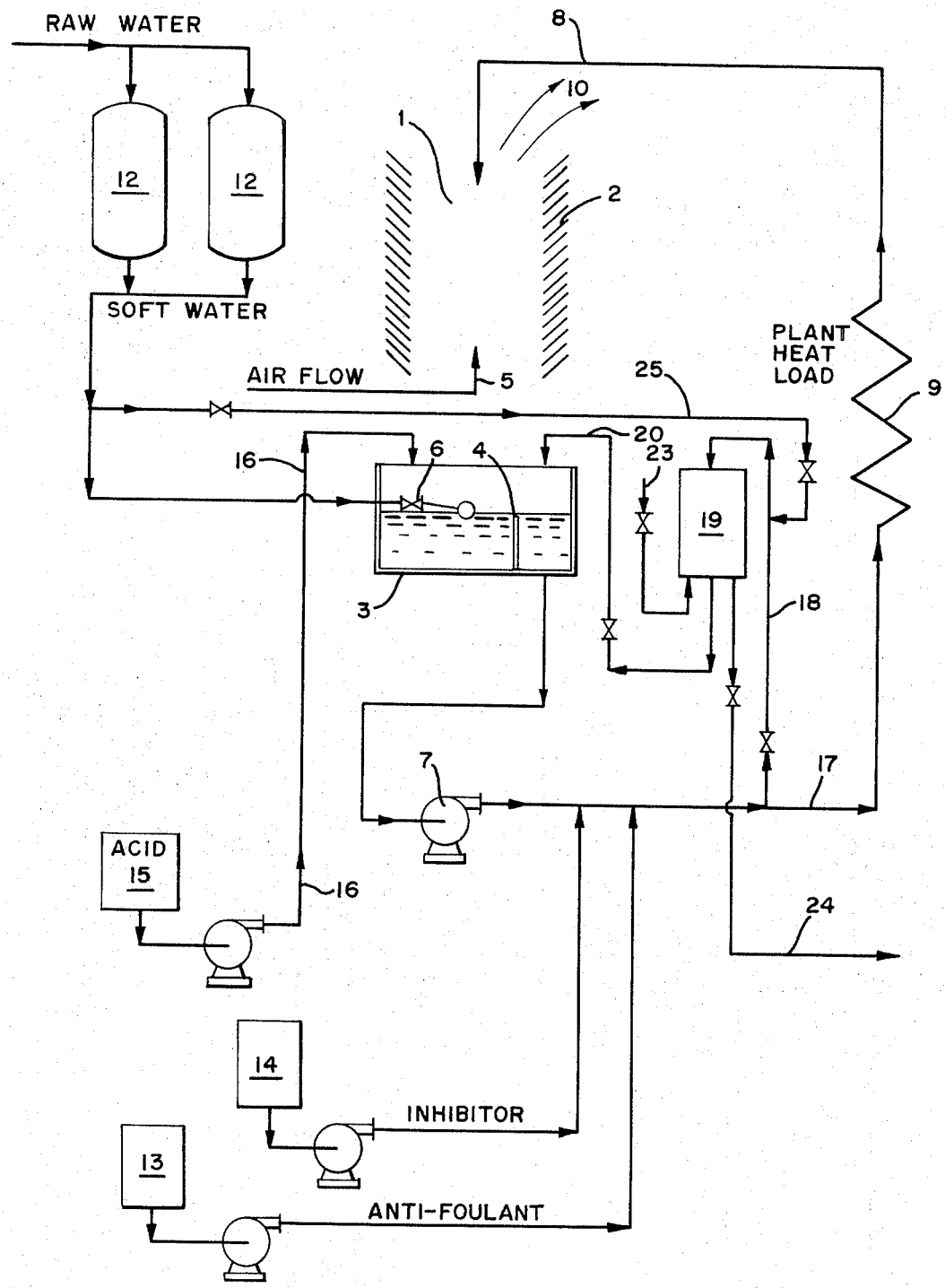

CIRCULATING COOLING SYSTEM

BACKGROUND OF THE INVENTION

1. Field of the Invention

This invention relates to cooling towers of the type that receive an aqueous coolant containing heat, generally absorbed from processing equipment to be cooled, removing the heat from the coolant by evaporating a portion thereof, and recycling the coolant at a lower temperature back to the processing equipment for further heat absorption. Generally, the aqueous coolants are comprised of water and one or more additives, such as corrosion inhibitors, to protect the processing equipment being cooled, anti-fouling agents to maintain the processing equipment relatively free of scale and sludge deposits, sequestering agents to overcome calcium and iron precipitation and biocides to prevent biological slime growths.

2. Description of the Prior Art

Cooling towers are widely used in industry where the flow of a coolant is required in such processing equipment as condensers, coils, jackets and other heat exchange means. In the interests of economy, the coolant is generally recycled, and a cooling tower used to remove the absorbed heat by evaporating a portion of the coolant.

In brief, the warmed coolant is generally permitted to flow over a large surface such as that provided by spaced strips of redwood, and is there subjected to a forced draft of air to bring about evaporation of a portion of the thus exposed coolant. The remaining coolant, which has given up heat to supply the heat of vaporization of the portion evaporated, flows to a reservoir from which it is pumped back to the processing equipment for the absorption of more heat, thus completing the cycle.

During this process the coolant absorbs oxygen from the air which adds to its corrosiveness.

The coolant is comprised of water and various additives such as corrosion inhibitors, anti-fouling agents, and microbiocides. These serve to minimize corrosion of the equipment being served and to maintain the equipment within practical limits of efficiency, by minimizing the formation of scale, sludge deposits and biological growth. Still another additive is acid, usually sulfuric, which is introduced as required to maintain the desired pH, generally between about 6.3 and 7.5. Too low a pH will lead to corrosion, whereas too high a pH in the presence of hard water results in scale and other deposits on the water side of the processing equipment.

Typical inorganic anodic corrosion inhibitors are sodium and potassium chromates and dichromates, polyphosphates, silicates, nitrites, ferrocyanides and molybdates. The chromates are probably the most commonly used due to their superior corrosion inhibition efficiency and low cost, but they have the disadvantage of being quite toxic. Typical inorganic cathodic corrosion inhibitors are the salts of zinc, nickel, manganese, and trivalent chromium, whereas among the typical organic compounds used as inhibitors are amines, amides, pyridines, carboxylic acids, esters, and mercaptans. Very often such inhibitors are used in combination to simultaneously give anodic and cathodic protection, or protection by one or more other mechanisms.

So-called "non-toxic" inhibitors are sometimes used which are specifically nonchromate inhibitors, however, they are not as effective as the chromate inhibitors. None of the non-toxic formulae developed for use in cooling systems except the chromates and possibly the silicates, give satisfactory results in the control of aluminum corrosion. Those containing zinc are subject to precipitation at pH's in excess of about 8.2, and corrosion inhibitor formulae based on combinations containing polyphosphate, suffer from reversion to orthophosphate and the precipitation of insoluble calcium phosphate. Furthermore, in the past few years phosphate disposal has also been limited by law in many localities because of its nutritive relationship to algae growth.

Typical of the many anti-fouling agents used are sodium fluoride or silicofluoride for complexing soluble aluminum ions, and organic dispersants and coagulants, both natural and synthetic. Among the organic dispersants are the lignosulfonates, polyacrylates, polyacrylamides and polyphosphonates. Various proprietary formulations of organic compounds have also recently been marketed as anti-foulants. These function by transforming foulant agglomerates into fluid sludges which will flush out of the circulating system.

Of the many biocides, chlorine probably is the most widely used. It presents the disadvantages, however, of attacking the wood generally used in construction of cooling towers, particularly when the pH of the coolant is on the alkaline side. Of the many proprietary biocides the chlorinated phenols, organotin-complex amine combinations, quaternary ammonium compounds, the rosin amine salts, copper salts, organic thiocyanates and acrolein, are typical.

In the past, it has frequently been the practice to shut down a cooling system after 6 to 12 months of operation, to clean the waterside surfaces of the processing equipment being served. In view of high labor costs and other considerations, the tendency more recently has been to run 24 to 36 months before "turn-around." For this reason, scale and other deposits on the waterside surfaces are now a major consideration, especially since the presence of appreciable scaling and fouling limits the efficiency of the processing equipment. Where peak efficiency is required, scaling and fouling become of primary concern. Deposits on waterside surfaces mean reduced and frequently uneven heat transfer, poor corrosion inhibitor performance, shortened equipment life, increased pumping costs and product loss due to ineffectual cooling.

The cooling tower systems of the prior art concentrate the hardness of the aqueous coolant and other contained undesirable impurities because of the rapid evaporation which is characteristic of all such cooling towers. If no steps were taken to rid the systems of this unwanted material and to limit the degree of hardness of the circulating coolant, the processing equipment would be fouled very rapidly. It would be rendered inefficient, and would require frequent down time for cleaning and actual equipment replacement. In an attempt to overcome these difficulties, a procedure is used known as "blowdown," in which a certain percentage of the recirculating coolant stream is purged from the system, carrying with it a portion of the unwanted scale and deposit-forming impurities. The blowdown is generally based on maintaining a materials balance in the system, so that the scaling and fouling constituents are not sufficiently concentrated to result in deposition on heat transfer surfaces. Although the degree of hardness maintained by such systems varies widely, depending on the hardness of the local water supply and the pH maintained in the system, a hardness of between about 300 and 600 ppm has generally been found satisfactory. On the other hand, a degree of hardness in excess of about 1,000 ppm has generally been found to lead to scale formation, and is therefore unacceptable.

The required amount of blowdown is quite considerable. For example, with a typical, moderately sized unit having a rate of circulation of 5,000 gals. per minute (gpm), the total quantity of blowdown over a 24 hour period can amount to 72,000 gals., or more than three times the total content of the system. This discarded water represents a very appreciable loss, both monetarily, and as a valuable resource.

The blowdown unfortunately also carries with it, the contained additives which are not only costly, but very serious environmental pollutants. This is particularly true for the widely used chromate inhibitors. Many areas have now established very low or zero tolerance limits for the disposal of chromium in receiving waters. The U.S. Public Health Service limit for potable water is 0.05 parts per million (ppm), but there are many areas where the discharge of cooling system blowdown containing any residual chromium at all, is banned. The seriousness of the problem can be appreciated when it is realized that a typical blowdown for a cooling system having a recirculation rate of 5,000 gpm, discharges with it, about 12 lbs. of $Na_2CrO_4$ per day, when the concentration of that inhibitor in the system amounts to about 20 ppm. Apart from the serious aspect of environmental pollution resulting from a cooling tower blowdown, the loss of water and valuable additives for a moderate sized industrial unit will amount to many thousands of dollars per year of operation.

Cooling systems and operating procedures of the prior art, where cooling was achieved through evaporation in conventional cooling towers, were plagued by the accumulation of salts and therefore a rapid increase in the degree of hardness of the aqueous coolant. This led to an increase in the rate of development of scaling and fouling of the equipment being served, which, as previously pointed out, increased maintenance costs, product loss through inadequate cooling and inefficient operation of the equipment. To partially alleviate this situation, it has been the practice to resort to blowdown, which is simply the technique of discharging a part of the coolant from the system and sending it to waste. By this means, the salts and degree of hardness would reach equilibrium at what was considered an acceptable level.

The method of operation with blowdown introduced several serious problems:

1. It contributed to environmental pollution, for some of the additives such as the chromate inhibitors are very toxic.
2. It perpetrated a very significant loss of costly additives.
3. It represented an appreciable loss of water.

SUMMARY OF THE INVENTION

I have now found a method of minimizing the extent of pollution, additive loss and water loss by up to 80 percent or more. In accordance with the present invention I accomplish these beneficial results by a process involving the following combination of steps:

a. circulating aqueous coolant in a heat exchange relationship with the processing equipment being served;

b. passing the heated coolant from the processing equipment to an evaporation zone to remove heat from the coolant by partial evaporation;

c. returning the cooled aqueous coolant from the evaporation zone to the processing equipment for further absorption of heat;

d. continuously recirculating the aqueous coolant without blowdown of the circulating coolant;

e. adding make-up water to the coolant having a hardness of less than 20 percent and preferably less than about 10 percent of the hardness of the circulating coolant; and f. bleeding a portion of the coolant from the circulating coolant, separating solids from the bleed, and returning the separated coolant to the circulating coolant.

As an additional feature, the separated solids may be washed with water and the water wash obtained, added to the circulating aqueous coolant as at least part of the make-up. Although in carrying out the method of the present invention, the system may be filled with water having a hardness of up to about 600 ppm, it is preferable to use water having a hardness of less than 150 ppm and more desirably, soft water, which is defined as water having a hardness of less than 50 ppm. Generally speaking, the softer the water used both for start-up and make-up, the better.

For a better understanding of the mechanism of the present invention, a reference is made to the drawing:

BRIEF DESCRIPTION OF THE DRAWING

The drawing represents a flow diagram of one embodiment of our invention.

Numeral 1 represents a typical cooling tower with evaporating surfaces 2, reservoir for cooled water 3, silt baffle 4 within the reservoir, forced air draft at 5, which is generally supplied by propellers, level controlled valve 6, circulating pump 7, which forces the cooled water through the system and heated water return line 8, which supplies the evaporating surfaces 2 with the aqueous coolant to be cooled.

The heat load of the processing equipment being served is shown as the "plant heat load" at 9. The aqueous solvent leaving 9, which has absorbed heat from processing equipment, flows over evaporating surfaces 2, thus presenting a large surface to the air as it is forced through the tower at 5. The water vapor evaporated, together with a small amount of entrained droplets termed "windage" or "drift," leaves the system at 10.

Initially, the system is filled with coolant, preferably having a hardness of less than about 150 ppm. Make-up water having a hardness of less than about 20 ppm, preferably less than 10 ppm enters reservoir 3 through level controlled valve 6. In the drawing, the water is shown as raw water which is softened by passing through sodium zeolite water softeners 12. Actually, the water may be naturally occurring soft water, rain water, condensed water, demineralized water or water otherwise treated, having a hardness of less than about 20 ppm, preferably less than 10 ppm. Vessels 13 and 14 represent supply tanks for initially charging the system with the desired additives, and subsequently for supplying make-up additives. Vessel 13 is shown as supplying anti-foulants which may be inorganic, organic, bacteriostats, biocides, etc. or mixtures of any of these. Gases, such as chlorine may also be introduced into the circulating coolant as biocides.

Vessel 14 is shown as supplying corrosion inhibitors such as chromates, silicates, polyphosphates, etc.

Vessel 15 supplies acid, preferably sulfuric acid through line 16 to the coolant, to maintain the pH between about 6.5 to 8.5, preferably between 7.0 and 8.2. The latter range is somewhat higher than is considered practical for systems containing the usual amount of hardness, but is less corrosive than a coolant having a lower pH, and is therefore an additional benefit of the present invention. Indeed, if additives using zinc are not employed, a pH ranging to 8.5 may be used to advantage.

A portion of the circulating stream of coolant, amounting to less than 10 percent of the total stream, preferably less than 5 percent, is diverted or bled from line 17, through line 18 to filter 19. The filtrate from 19 is normally returned to reservoir 3 through line 20.

Filter 19 may be one of several different types, but preferably one which will permit back-washing. Any commercial filter, such as a Dollinger cartridge filter, is quite adequate.

In operation solids tend to accumulate in the system, such as extraneous dirt and dust which blow onto the exposed evaporating surfaces, wood splinters from redwood strips, if used to provide evaporating surface in the tower, rust and detached scale and mineral deposits from vessel jackets and the water surfaces of heat exchange equipment, etc. Such solids in side stream 18 are removed by filter 19. Preferably there are at least two such filters in parallel, so that one may be flushed free of solids without halting the removal of solids by the other.

When it is time to discharge solids from filter 19, it may be back-washed with raw water from line 23, thereby flushing the solids out through line 24 to a settling pond or other point of disposal.

Although the amount of coolant and accompanying additives adhering to these solids would be almost negligible, even this small amount can be retained in the system, for prior to the discard of the solids it is preferably washed with soft water through line 25, with the resulting wash water being directed into the circulating system through line 20 as at least part of the required make-up.

The cooling system of the present invention will reach equilibrium, with the hardness of the circulating coolant being sufficiently low, so that a closed circuit system without blowdown is practical. Not only is it practical, but with the low degree of hardness the pH of the coolant may be maintained between about 7.0 and 8.5 which is higher than would otherwise be practical, and thus in a range where it is less corrosive. Furthermore, the low degree of hardness means substantially no scale and mineral deposit on the water surfaces of the processing equipment, thus maintaining heat transfer at a point of high efficiency and reducing maintenance costs.

The cooling system may be operated at the start under substantially equilibrium conditions if the hardness of the start-up charge and of the make-up water are properly selected, but it is not important to do so, for if the hardness of the make-up water is substantially less than that of the circulating coolant, the hardness of the coolant will actually drop until it reaches equilibrium at a point wherein the degree of hardness is roughly 10 to 20 times that of the make-up water. The actual point of equilibrium will vary with the temperature and weather, levelling at a somewhat higher degree of hardness when conditions favor rapid evaporation, and lower, when for example, the weather is hot and humid.

The degree of hardness which will be attained when equilibrium conditions are reached in the system of the present invention, can be closely estimated by applying the formula:

$$H = H'W/(E + W)$$

where:
$H$ is the hardness of the make-up water in ppm*
$H'$ is the hardness of the coolant (ppm),
$E$ is the rate of evaporation (gpm), and
$W$ is the loss through windage (gpm).

*"Betz Handbook of Water Conditioning," Sixth Edition, pp 370–376.

Ordinarily, the windage will vary from 0.1 to 0.3 percent of the circulation rate, whereas the evaporation will vary from 1.0 to 4.0 percent, same basis.

Merely as illustrative, the following tabulation will show the relationship between the hardness of the make-up water, the hardness of the circulating body of coolant, the amount of evaporation, and the total amount of windage loss under typical equilibrium conditions.

| Run | Hardness (H) Make-up Water | Hardness (H') Coolant | Evaporation Loss (E) | Windage Loss (W) |
|---|---|---|---|---|
| A | 1.8 ppm | 20 ppm | 100 gpm | 10 gpm |
| B | 4.5 ppm | 50 ppm | 100 gpm | 10 gpm |
| C | 9.1 ppm | 100 ppm | 100 gpm | 10 gpm |
| D | 18.2 ppm | 200 ppm | 100 gpm | 10 gpm |

It should be noted that, in each instance, the hardness shown for the make-up water ($H$) is that required to maintain the specific hardness ($H'$) of the coolant. If on the other hand, the hardness of the make-up water had in any particular case been appreciably less than that shown, the hardness of the system would drop in operation, reaching equilibrium after a prolonger period at a hardness of between about 10 to 20 times that of the make-up water.

The hardness of make-up water required to maintain equilibrium with a coolant of any specific degree of hardness will vary with the evaporation loss and the windage loss.

When the hardness of the make-up water is less than that required to maintain the specific hardness of a coolant, then the hardness of the coolant will slowly drop with the operation of the cooling system, approaching equilibrium with an ultimate hardness of about 10 to 20 times the hardness of the make-up water.

Special conditions apply when the water used initially as the coolant is low in hardness, as for example, when it ranges from 10 to zero, or approaches zero. Under these circumstances the operation can be conducted without blowdown, even when the hardness of the make-up is equal to or slightly in excess of that of the coolant.

This invention is particularly applicable to industrial cooling systems where the total charge of coolant in the system amounts to about at least 10,000 gals.

The combined windage and evaporation loss is, of course, equivalent to the make-up, which normally is automatically fed in through a liquid level control valve in the reservoir. To determine the relationship between windage and evaporation, it is only necessary to know the ratio between the dissolved solids in the circulating coolant (water plus additives) and in the make-up water. Since these dissolved solids are substantially in proportion to the chloride content of the respective solutions, a chloride determination of each serves as an easy method of determining the desired relationship. The test methods and mathematical derivation of the formula for determining the amount of windage may be found on pages 254 – 256 in the "Betz Handbook of Industrial Water Conditioning," Sixth Edition, 1962, Betz Publishing Co., Trevose, Pa. The same reference provides a method of determining hardness, pages 370 – 376.

An operation was conducted using an industrial sized cooling tower and circulating system, operating with a total of 25,000 gals.

The unit was substantially as illustrated in the drawing, and successfully demonstrated that the process of the present invention could be operated continuously without blowdown, even when using a coolant having a hardness greater than 100 ppm. Specifically, a coolant was circulated at the rate of 5,000 gpm without blowdown. Leaving the tower at 80° F., it passed in heat exchange relationship with processing equipment, at which point it absorbed sufficient heat to raise its temperature to 100° F. Returning to the evaporation zone of the cooling tower, it sustained a windage or entrainment loss of 10 gpm, and an evaporation loss of 100 gpm. The temperature of the remainder of the coolant was thereby reduced to 80° F. for return to the processing equipment for further heat absorption.

The circulating coolant had a pH of 7.8 ± 0.2, sulfuric acid being added as required to maintain the pH within this range. Further, it had a conductance of 1,800 mmhos, a hardness of about 120 ppm, and a $CrO_4$ content of 30 ppm.

A portion of the circulating body of coolant in the amount of 100 gpm was diverted through a filter to remove solids, and the filtrate returned to the circulating body of coolant. The solids were washed once a day with make-up water, with the washes going into the circulating coolant as part of the necessary make-up. The solids were then flushed out of the filter and discharged into a wash lagoon by using 100 gpm of raw water for 10 minutes as backwash. No chromates could be detected in the discarded solids or backwash.

Make-up water was added to the system as required to maintain the level in the reservoir of the cooling tower, a level control valve automatically taking care of this addition. This make-up water consisted of raw water which had passed through a sodium zeolite water softener. This treatment left the make-up water with a hardness of about 0.1 ppm, a pH of 7.3, and a conductivity of 240 mmhos. The addition of 110 gpm were required as make-up (including the filter wash previously mentioned) to replace an equal amount which left the system by evaporation and windage. Minor amounts of corrosion inhibitor and anti-foulants were added periodically to compensate for losses due to windage. The circulating body of coolant over a long period dropped in hardness, and would continue to do so until in equilibrium in accordance with the formula previously given.

The corrosive action of the circulating coolant was checked against three commonly used metals at a temperature of 105° to 110° F. for a period of 240 hours, with a chromate-zinc inhibitor. $CrO_4$ was present in the circulating coolant to the extent of 30 ppm, and the Zn ion, to the extent of 4.8 ppm:

A-285 Steel — .002 inches per year (IPY)
90-10 Cu-Ni less than — .001 IPY
SS 304 less than — .001 IPY Since certain changes may be made in carrying out the above process without departing from the scope of the invention, it is intended that all matter contained in the above description shall be interpreted as illustrative and not in a limiting sense.

I claim:

1. A method of removing heat from a body comprising:
   a. circulating aqueous coolant in a heat exchange relationship with the body;
   b. passing the heated coolant from the body to an evaporation zone to remove heat from the coolant by partial evaporation;
   c. returning the cooled aqueous coolant from the evaporation zone to the body for further absorption of heat;
   d. continuously recirculating the aqueous coolant without blowdown of the circulating coolant;
   e. adding make-up water to the coolant, said make-up water having a hardness of less than 20 percent of the hardness of the circulating coolant; and
   f. bleeding a portion of the coolant from the circulating coolant, separating solids from the bleed, and returning the separated coolant to the circulating coolant.

2. The method of claim 1 wherein the bleed constitutes less than 10 percent of the total coolant circulated.

3. The method of claim 1 wherein the separated solids are washed with water, and the wash water obtained is introduced into the circulating coolant as at least a part of the make-up water.

4. The method of claim 1 wherein the circulating coolant contains an additive selected from the group consisting of a corrosion inhibitor, a sequestering agent, an anti-fouling agent, a biocide and mixtures thereof.

5. The method of claim 4 wherein additives are introduced into the aqueous coolant in an amount substantially equal to that lost by windage.

6. A method of removing heat from a body comprising:
   a. circulating aqueous coolant having a hardness of less than 10 ppm in a heat exchange relationship with the body;
   b. passing the heated coolant from the body to an evaporation zone to remove heat from the coolant by partial evaporation;
   c. returning the cooled aqueous coolant from the evaporation zone to the body for further absorption of heat;
   d. continuously recirculating the aqueous coolant without blowdown of the circulating coolant;

e. adding make-up water to the coolant, said make-up water having a hardness of less than 10 ppm; and f. bleeding a portion of the coolant from the circulating coolant, separating solids from the bleed, and returning the separated coolant to the circulating coolant.

7. The method of claim 1 wherein the pH of the coolant is within the range of 7.0 to 8.5 and the hardness of the coolant is less than 50 ppm.

* * * * *